US012090558B2

(12) United States Patent
Suzuki et al.

(10) Patent No.: US 12,090,558 B2
(45) Date of Patent: Sep. 17, 2024

(54) CUTTING INSERT

(71) Applicant: TUNGALOY CORPORATION, Fukushima (JP)

(72) Inventors: Yusuke Suzuki, Iwaki (JP); Yasutake Sasaki, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 25 days.

(21) Appl. No.: 17/550,136

(22) Filed: Dec. 14, 2021

(65) Prior Publication Data

US 2022/0274184 A1    Sep. 1, 2022

(30) Foreign Application Priority Data

Feb. 26, 2021   (JP) .................................. 2021-029407

(51) Int. Cl.
*B23B 27/16* (2006.01)
*B23B 27/04* (2006.01)

(52) U.S. Cl.
CPC ............ *B23B 27/16* (2013.01); *B23B 27/045* (2013.01); *B23B 27/1607* (2013.01)

(58) Field of Classification Search
CPC . B23B 27/1607; B23B 27/141; B23B 27/143; B23B 27/22; B23B 27/045;

(Continued)

(56) References Cited

U.S. PATENT DOCUMENTS 4,969,779 A    11/1990   Barten
9,821,376 B2 *  11/2017  Tsuda ................... B23B 27/141

(Continued)

FOREIGN PATENT DOCUMENTS

JP    H02-284805 A    11/1990
JP    2006-341321 A   12/2006

(Continued)

OTHER PUBLICATIONS

JP-4829197-B2 Machine Translation (Year: 2011).*

*Primary Examiner* — Alan Snyder
*Assistant Examiner* — Reinaldo A Vargas Del Rio
(74) *Attorney, Agent, or Firm* — Studebaker & Brackett PC

(57) ABSTRACT

Chip discharge during high-feed machining and low-feed machining particularly in a high-depth-of-cut state or the like is improved so as to provide adaptability to a wide range of cutting conditions during low depth and high depth cutting and during low-feed and high-feed machining and allow so-called freedom of feed during cutting to be improved. A cutting insert includes a cutting edge body and a substrate to which the cutting edge body is joined. The cutting edge body has a prismatic shape having a longitudinal direction and a lateral direction perpendicular to the longitudinal direction and includes a cutting edge formed on an intersecting edge between a peripheral side surface and an upper surface of the cutting edge body having the prismatic shape and a recessed part formed at a position on the upper surface of the cutting edge body which is more distant from the intersecting edge than from the cutting edge. The substrate has a projected part upwardly projecting from the upper surface of the cutting edge body.

11 Claims, 18 Drawing Sheets

(58) Field of Classification Search
CPC ............ B23B 2270/30; B23B 2210/06; B23B 2200/323; B23B 2200/326; B23B 2200/32; B23B 2200/0447; B23B 2200/081; B23B 2200/086; B23B 2200/087; B23B 2200/321; B23B 2200/0423; B23B 2200/0485; B23B 2226/125

See application file for complete search history.

(56) References Cited

U.S. PATENT DOCUMENTS

| | | | |
|---|---|---|---|
| 10,286,455 B2* | 5/2019 | Tomoda | B23B 27/20 |
| 10,717,136 B2* | 7/2020 | Shimanuki | B23B 27/04 |
| 11,305,358 B2* | 4/2022 | Fukuhara | B23B 27/045 |
| 2019/0143419 A1 | 5/2019 | Shimanuki et al. | |
| 2019/0176239 A1* | 6/2019 | Hirukawa | B23B 27/145 |

FOREIGN PATENT DOCUMENTS

| | | |
|---|---|---|
| JP | 4829197 B2 * | 12/2011 |
| JP | 2012-525987 A | 10/2012 |
| JP | 2017-196693 A | 11/2017 |
| WO | 2010/128085 A1 | 11/2010 |

* cited by examiner

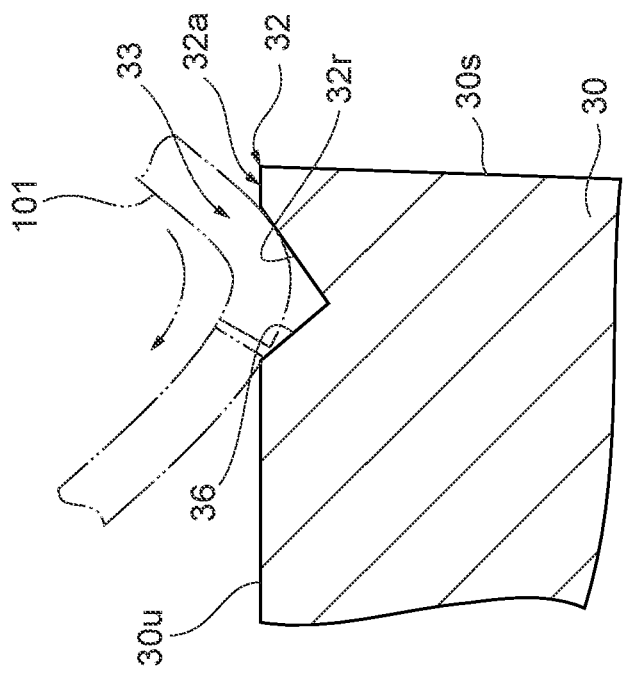
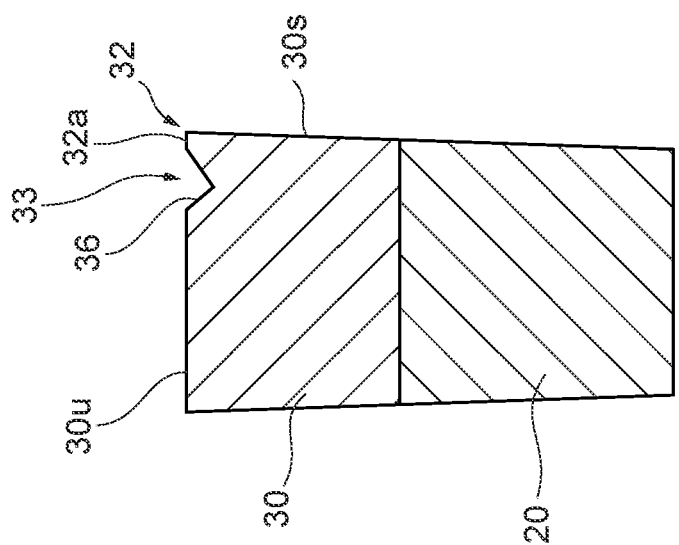

CUTTING INSERT

BACKGROUND

Field

The present invention relates to a cutting insert.

Description of Related Art

Conventionally, as tools for turning, various cutting inserts have been used and, with respect to such cutting inserts, a technology (see, e.g., Japanese Patent No. 4829197) related to a sintered body tool in which a cemented carbide chip breaker is left, a technology (see, e.g., Patent Publication JP2017-196693A) of adding a chip breaker to a sintered body, and the like are also proposed. In addition, an approach to improving chip control of an insert (chip) obtained by brazing a sintered body, formed under an ultrahigh pressure, to an ultrahard substrate has conventionally been proposed (see Japanese Patent No. 4829197 and Patent Publication JP2017-196693A).

SUMMARY

However, conventional cutting inserts still have various problems to be solved. It can be said that, in terms of chip discharge particularly during high depth (a state where a cutting edge of an insert that cuts into a workpiece is relatively long) cutting when a feed speed of the cutting insert in a direction of a rotational axis of the workpiece is set relatively high (during so-called high-feed operation) or when the feed speed of the cutting insert is conversely set relatively low (during so-called low-feed operation), there is still room for further improvement and, in this regard, it can also be said that there are still some points to be improved in so-called freedom of feed of the cutting insert. The following are specific examples thereof.

For example, in Japanese Patent No. 4829197, a projection for chip control is formed on a rake surface of a cutting tool main body so as to provide a brazed cutting tool having a simple shape and high chip control. However, a method of thus giving a chip breaker function to a projecting portion provided on an ultrahard substrate has a property such that a distance between a cutting point and the projecting portion depends on a size of a sintered body. Consequently, dimensions of the sintered body, a length of the cutting edge, and the like are limited. Therefore, it is difficult to improve the chip control during the low depth cutting (a state where the cutting edge of the insert that cuts into the workpiece is relatively short) or during the low-feed operation. In addition, in a cutting tool (brazed cutting tool) such as used in Japanese Patent No. 4829197, the sintered body has a flat upper surface, and accordingly chips may not be able to be controlled during the low depth cutting or the low-feed operation.

As a solution to such a problem as described above, a technology of providing the upper surface of the sintered body with a recessed shape and thereby controlling chips under low-depth-of-cut and low-feed conditions, such as proposed in Patent Publication JP2017-196693A, can be proposed. However, in such a technology, it is difficult to ensure a sufficient depth for controlling chips under high-depth-of-cut and high-feed conditions. When consideration is given to profile machining (copy machining of cutting), high-depth-of-cut/low-feed machining is most important for a shape of an insert (chip corresponding to groove machining and lateral feed external shape machining) mainly for the profile machining. In the technology described in Japanese Patent No. 4829197, chip control during so-called one-step finishing which includes no rough machining step is not sufficient while, in the technology described in Patent Publication JP2017-196693A, adaptability particularly to high-feed machining is insufficient, and it can be said that the technologies have problems in these respects.

It is therefore an object of the present invention to provide a cutting insert having improved chip discharge during high-feed machining or low-feed machining particularly in a high-depth-of-cut state or the like so as to be adaptable to a wide range of cutting conditions during low depth and high depth cutting and during low-feed and high-feed machining and allow so-called freedom of feed during cutting to be improved.

An aspect of the present invention is a cutting insert including a cutting edge body and a substrate to which the cutting edge body is joined. The cutting edge body has a prismatic shape having a longitudinal direction and a lateral direction perpendicular to the longitudinal direction and includes: a cutting edge formed on an intersecting edge between a peripheral side surface and an upper surface of the cutting edge body having the prismatic shape; and a recessed part formed at a position on the upper surface of the cutting edge body, the position being more distant from the intersecting edge than from the cutting edge. The substrate has a projected part upwardly projecting from the upper surface of the cutting edge body.

With the cutting insert according to an aspect as described above, it is possible to perform machining (processing) by causing a recessed part provided in a cutting edge body (such as a sintered body) to function as a chip breaker for chips during low depth cutting and perform machining (processing) by causing a projected part provided on a substrate to function as the chip breaker for chips during high depth cutting and during high-feed operation. With the cutting insert thus configured, it is possible to adaptively perform machining under a wide range of cutting conditions during low depth and high depth cutting and during low-feed and high-feed machining.

In the cutting insert described above, the cutting edge body may be an ultrahigh-pressure sintered body to be joined to the substrate.

In the cutting insert described above, the cutting edge may be connected to a rake surface having a positive rake angle in a cross section perpendicular to the cutting edge.

In the cutting insert described above, it may be possible that the recessed part has a recessed shape parallel to the cutting edge, the rake surface is inclined in a direction further away from the upper surface with increasing distance from the cutting edge, and the recessed part is further provided with a wall surface inclined at an angle having a sign opposite to that of the angle of the rake surface.

In the cutting insert described above, the wall surface may be formed with a chip breaker.

In the cutting insert described above, it may be possible that, as the cutting edge, a side cutting edge is formed on one end side in the lateral direction and the side cutting edge is formed to extend to a position beyond a position distant by a predetermined value from a front surface of the substrate serving as one end thereof in the longitudinal direction.

In the cutting insert described above, the projected part may be formed at a position distant by the predetermined value from the front surface.

In the cutting insert described above, the projected part may have an inclined surface which is inclined with respect to the side cutting edge in a top view.

In the cutting insert described above, the inclined surface may be formed so as to be closer to one end side in the lateral direction on which the side cutting edge is formed, with increasing distance from the front surface.

In the cutting insert described above, the inclined surface may be formed at an angle of 60° to 80° with respect to the lateral direction in a top view.

In the cutting insert described above, the inclined surface may be formed to have an angle of 5° to 10° in a direction further away from the front surface, with increasing distance from the front surface.

In the cutting insert described above, the projected part may be formed in a shape connected to any one surface at which the cutting edge body and the substrate are in contact with each other.

BRIEF DESCRIPTION OF DRAWINGS

FIG. 12A is a cross-sectional view of the cutting insert along a line XII-XII in FIG. 7;

FIG. 12B is a diagram illustrating a portion around a recessed part of the cutting insert illustrated in FIG. 12A in enlarged relation;

DETAILED DESCRIPTION

Figure 1:
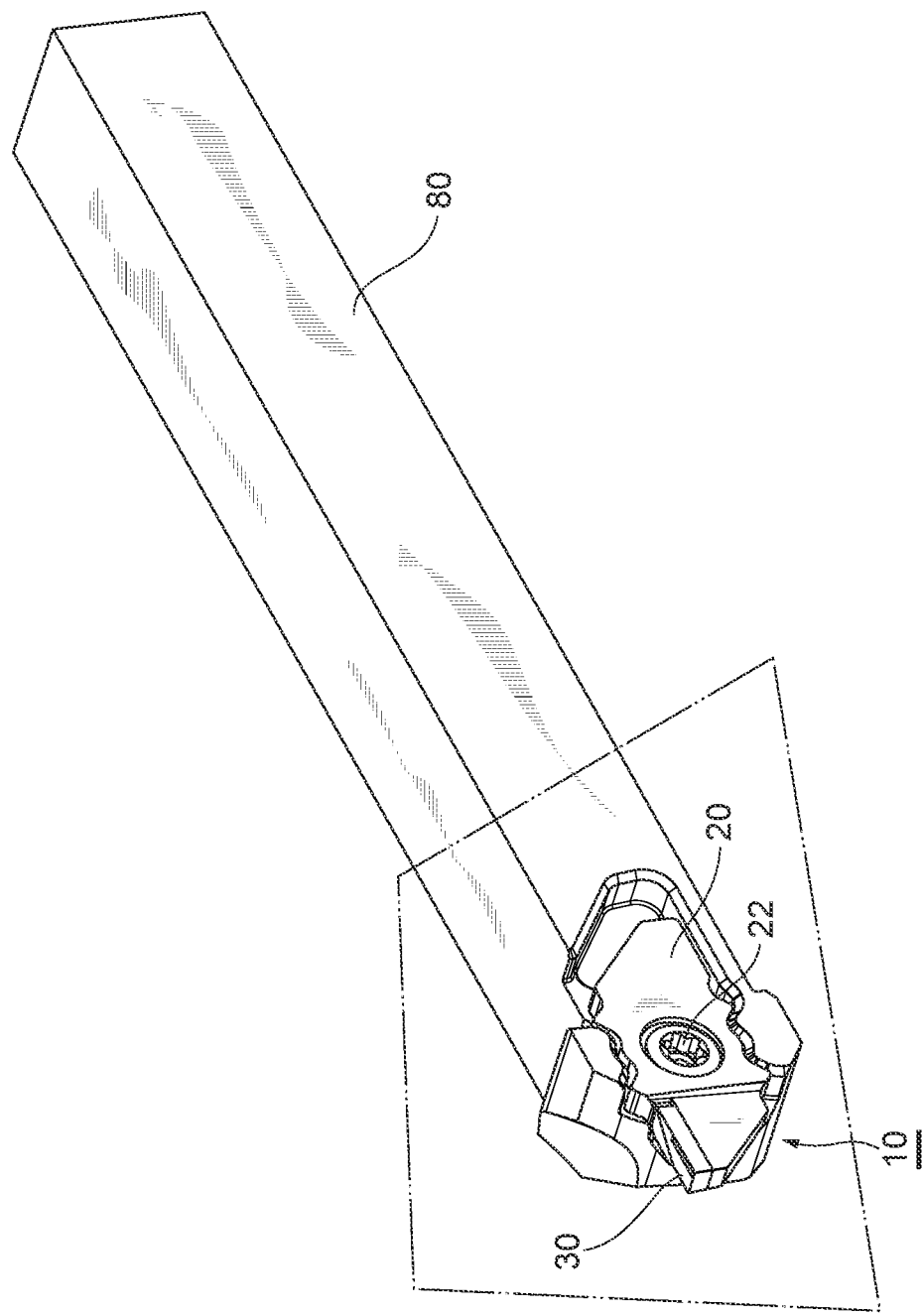
FIG. 1 is a perspective view illustrating an example of a cutting tool holder having a cutting insert in an aspect of the present invention mounted thereon.

Referring to the drawings, a detailed description will be given below of a preferred embodiment of a cutting tool according to the present invention (see FIG. 1 and the like).

A cutting insert 10 according to the present invention is configured as a cutting insert which is preferably used for turning using an automatic lathe tool such as a small lathe. The cutting insert 10 is formed by joining, to a substrate (base insert) 20, a cutting edge body 30 made of an ultra-high-pressure sintered body having a hardness higher than that of the substrate 20 by brazing. The cutting insert 10 having such a configuration has an extremely high abrasion resistance, and accordingly can be used to cut various metal materials such as cast iron, a high-hardness metal material, and a non-ferrous alloy of aluminum or the like (see FIGS. 1 and 2 and the like). The cutting insert 10 in the present embodiment is mounted on a cutting tool holder 80, fed in a grooving direction during groove machining, and fed in a lateral feed direction during lateral feed machining to be used to cut a work (workpiece) 100 (see FIGS. 17 and 18).

Cutting Edge Body

Figure 3:
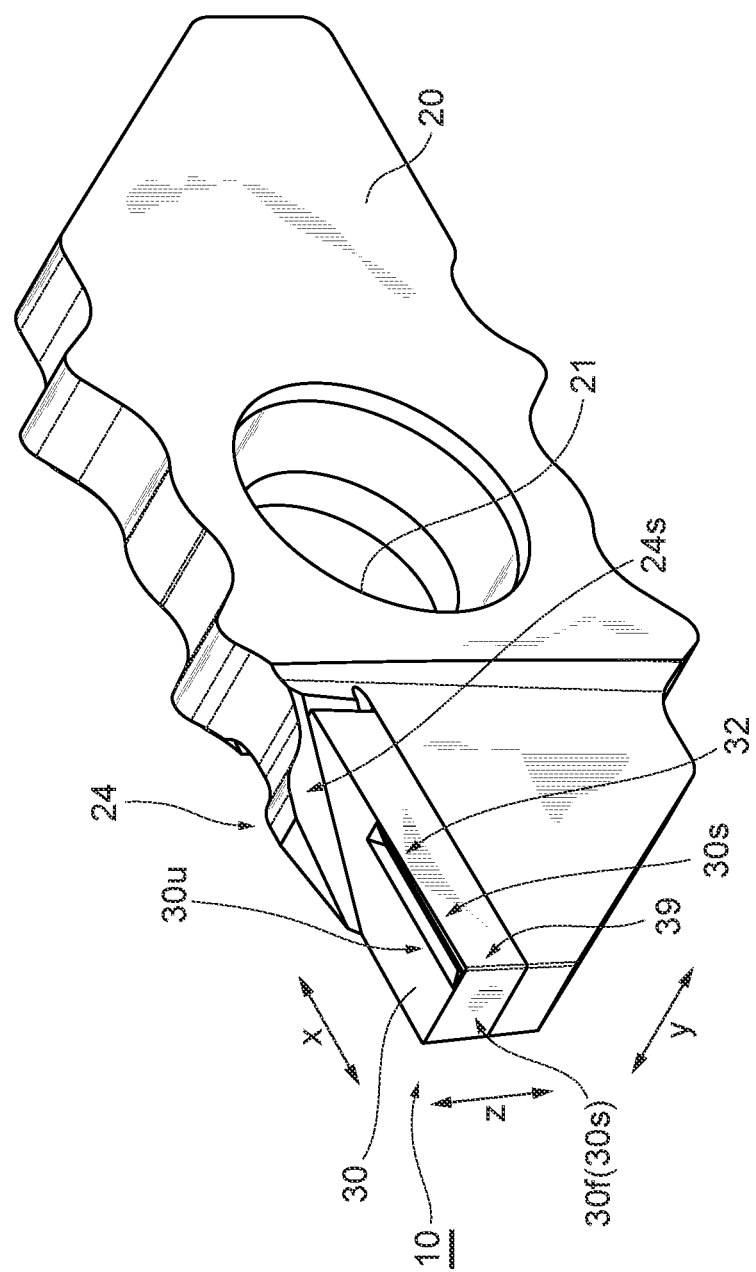
FIG. 3 is a perspective view illustrating an example of the cutting insert.
Figure 4:
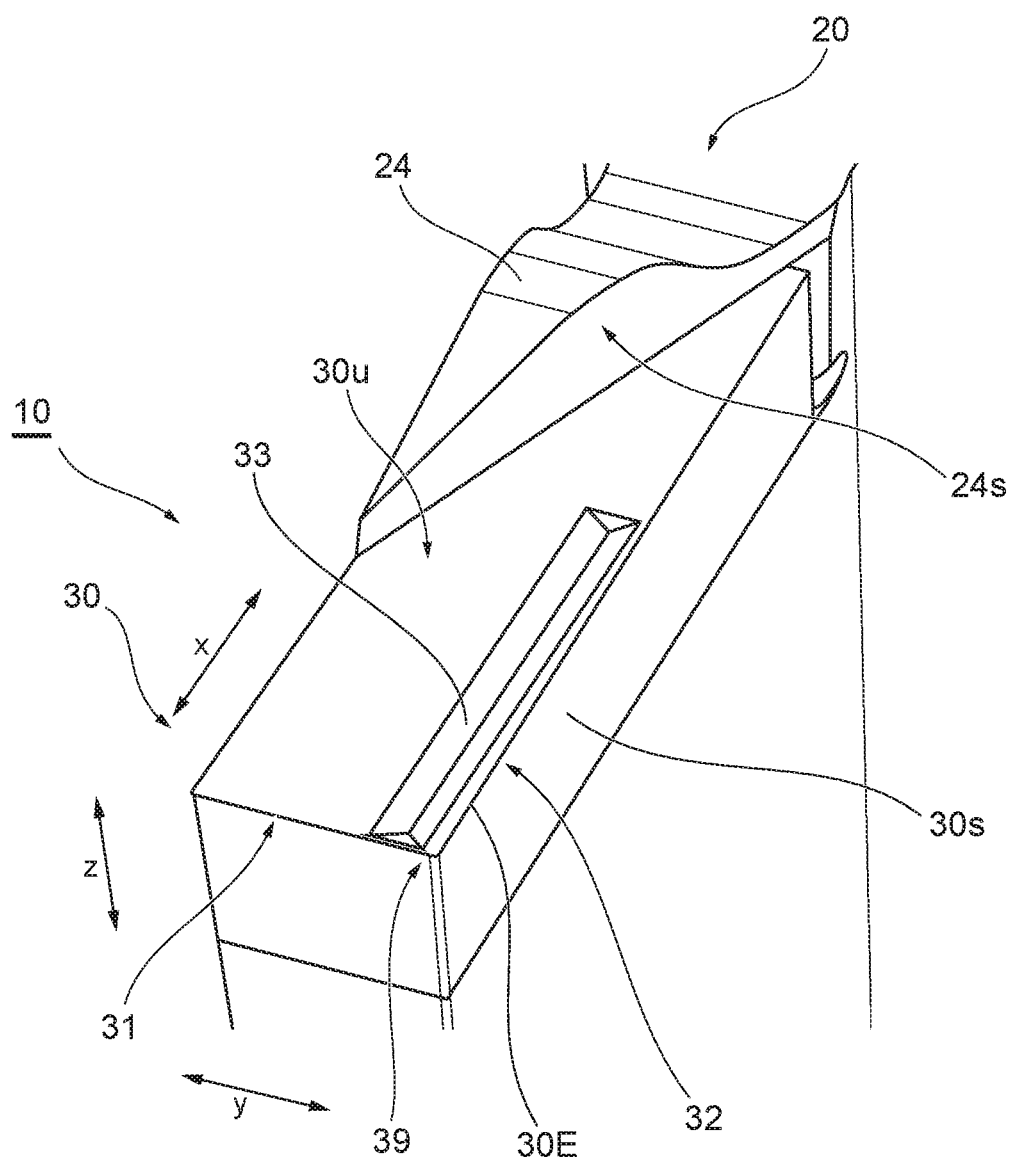
FIG. 4 is a perspective view obtained by viewing the cutting insert at another angle.

The cutting edge body 30 is made of the ultrahigh-pressure sintered body formed in a prismatic shape having a longitudinal direction x extending in the grooving direction, a lateral direction y perpendicular to the longitudinal direction x and extending in the lateral feed direction, and a vertical direction z perpendicular to each of the longitudinal direction x and the lateral direction y (see FIGS. 3 and 4 and the like). The cutting edge body 30 has an upper surface 30u and a lower surface serving as a mounting surface with respect to the substrate 20 each formed in a substantially trapezoidal shape (see FIG. 7 and the like). Between the upper surface 30u and the lower surface, a peripheral side surface 30s is formed (see FIG. 5 and the like). The cutting edge body 30 thus configured is formed with a cutting edge (a front cutting edge 31 and one side cutting edge 32), a recessed part 33, and the like (see FIGS. 6 to 11 and the like).

Figure 5:
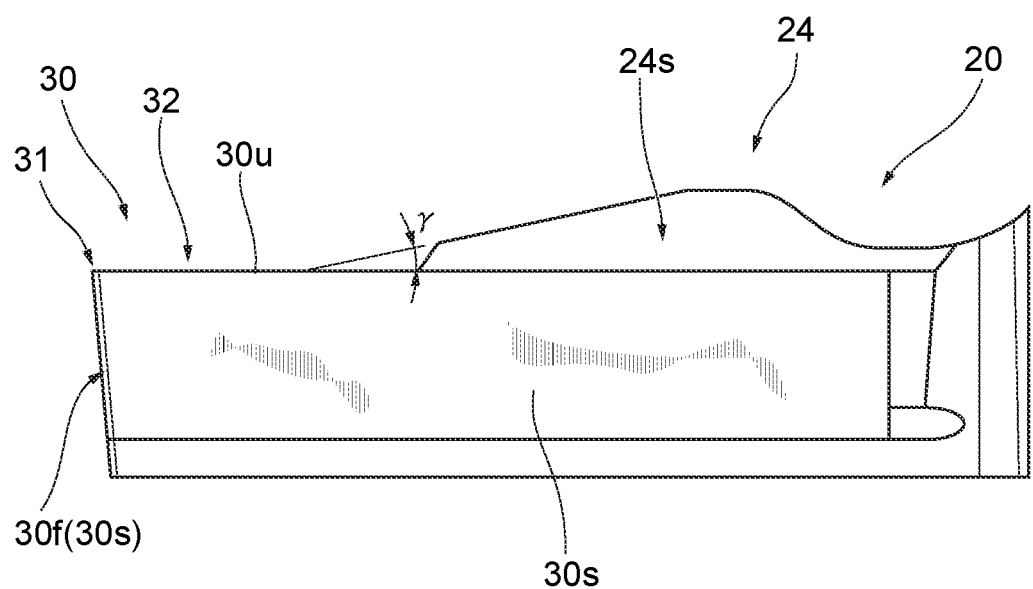
FIG. 5 is a diagram obtained by viewing a cutting edge portion of the cutting insert from a right side.
Figure 13:
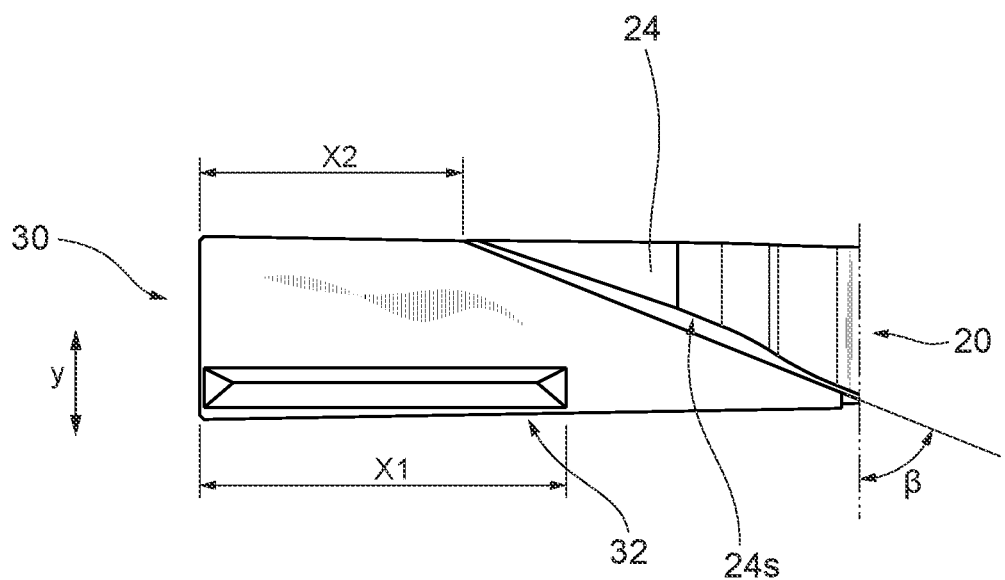
FIG. 13 is a plan view illustrating an example of the cutting insert.

The cutting edge includes the front cutting edge (having a length of 2 mm given by way of example for reference, though the length is by no means limited) 31 formed on an intersecting edge (denoted by a reference sign 30E in FIG. 4) between the peripheral side surface 30s and the upper surface 30u of the cutting edge body 30 and the side cutting edge (having a length X2 of 6 mm similarly given by way of example for reference) 32 (see FIGS. 5 and 13 and the like). The front cutting edge 31 and the side cutting edge 32 are connected via a corner cutting edge (a corner R has a radius of 0.05 mm given by way of example for reference, though a size thereof is by no means limited) 39 (see FIG. 7 and the like). The front cutting edge 31 is formed on an intersecting edge between a leading-end-side surface (front surface 30f (Note that the front surface 30f is a portion of the peripheral side surface 30s)) in the longitudinal direction x and the upper surface 30u to be used when groove machining is performed on the work 100. The front cutting edge 31 in the present embodiment is formed perpendicular to the longitudinal direction x of the cutting edge body 30. In the vicinity of the front cutting edge 31, a recessed part including a rake surface may also be provided, though not particularly shown.

Figure 6:
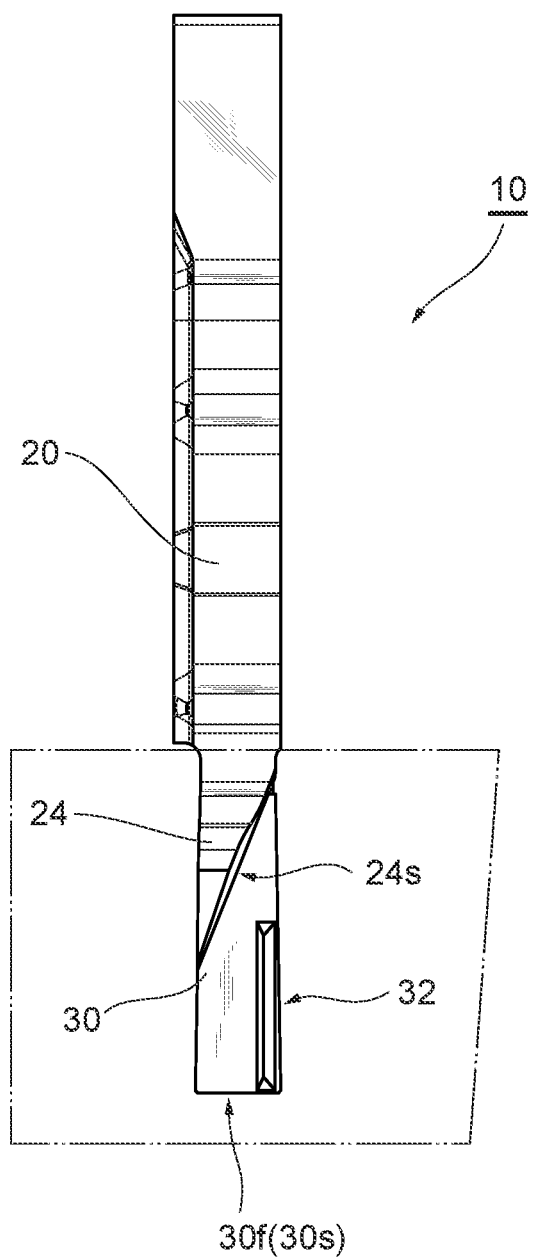
FIG. 6 is a plan view of the cutting insert.
Figure 7:
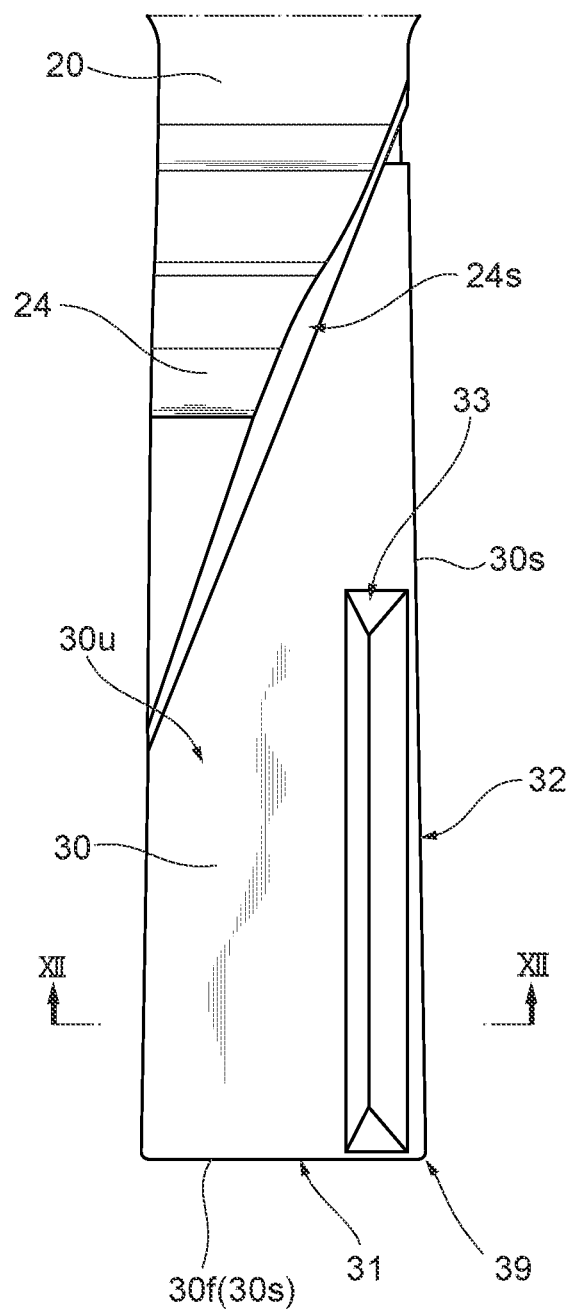
FIG. 7 is a diagram illustrating a frame portion in FIG. 6 in enlarged relation.
Figure 8A:
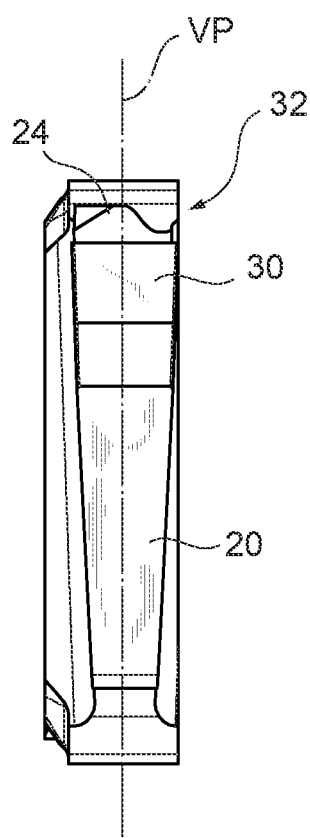
FIG. 8A is a front view obtained by viewing the cutting insert from a leading end portion along a longitudinal direction thereof.
Figure 8B:
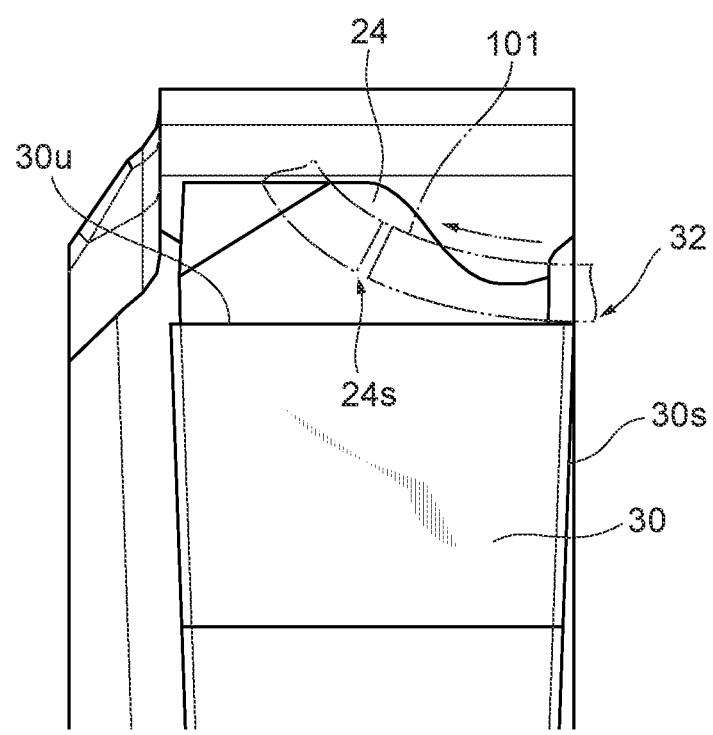
FIG. 8B is a diagram illustrating a cutting edge body portion of the cutting insert illustrated in FIG. 8A in enlarged relation.
Figure 9:
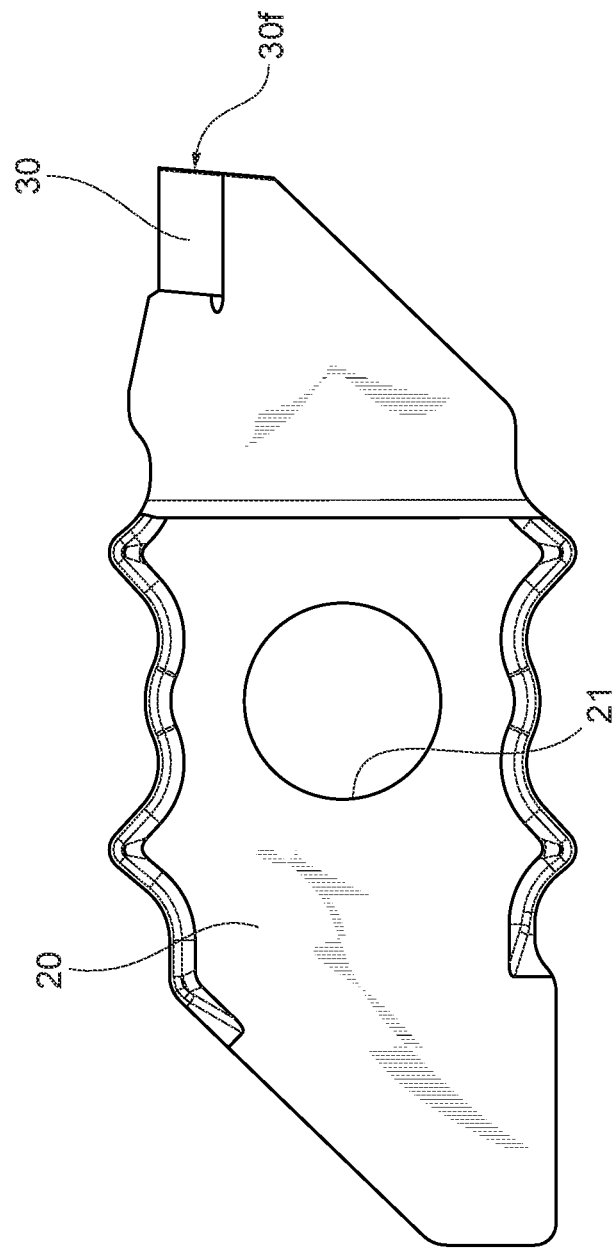
FIG. 9 is a left side view of the cutting insert.

The side cutting edge 32 is formed on one end side of the cutting edge body 30 in the lateral direction y (see FIGS. 6, 8A, and 8B and the like). The side cutting edge 32 is formed on an intersecting edge between a side surface (which is a right side surface in the case of the present embodiment (see FIG. 10)) on one end side in the lateral direction y and the upper surface 30u to be used when lateral feed machining is performed on the work 100. It may also be possible that another side cutting edge is formed on a side opposite to the side cutting edge 32 (side opposite to the side cutting edge 32 with respect to a virtual perpendicular plane VP (see FIGS. 8A and 8B) perpendicular to the front cutting edge 31 and halving the front cutting edge 31), though not particularly shown in the present embodiment. In this case, another (the other) side cutting edge is formed on an intersecting edge between a side surface on the other end side in the lateral direction y (which is a left side surface (see FIG. 9) in the case of the present embodiment) and the upper surface 30u. The other side cutting edge may also be formed to have a length in the longitudinal direction x which is shorter than that of the one side cutting edge 32.

The recessed part 33 is formed at a position on the upper surface 30u which is subsequent to the side cutting edge 32 in the lateral direction y (see FIGS. 12A,12B, and 13 and the like). The recessed part 33 in the present embodiment has a recessed shape parallel to the side cutting edge 32. A portion of the recessed part 33 immediately close to the side cutting edge 32 is formed with an inclined surface functioning as a rake surface 32r of the side cutting edge 32. Between the rake surface 32r and the side cutting edge 32, there is a narrow land part 32a (see FIG. 12B). The side cutting edge 32 is connected to the land part 32a in a cross section perpendicular to the side cutting edge 32 (see FIGS. 12A, 12B, and 13). The rake surface 32r in the present embodiment has a positive rake angle and is inclined in a direction further away from the upper surface 32u with increasing distance from the side cutting edge 32. The recessed part 33 is further provided with a wall surface 36 inclined at an angle having a sign opposite to that of the angle of the rake surface 32r (see FIGS. 12A and 12B and the like). The wall surface 36 may also be formed to have an appropriate surface to control chips, such as to smoothly move thick chips depending on a mode or a feed speed during cutting or exert a force on thin chips and cut the thin chips or have an appropriate shape to perform preferred machining.

Note that the rake surface 32r may also include a plurality of surfaces, though not particularly shown. In the cutting edge body 30 in the present embodiment, the one (first rake surface) of the plurality of rake surfaces 32r closest to the side cutting edge 32 is configured to function as the land part (narrow first rake surface) 32a described above. When the land part 32a thus configured is formed, the side cutting edge 32 is connected to the rake surface (the other portion thereof) 32r via the land part 32a. To give a specific example, the land part 32a parallel to the side cutting edge 32 may also be formed to have a width of, e.g., 0.05 mm. Alternatively, the rake surface 32r having a rake angle of 21° in a cross section on a plane perpendicular to the side cutting edge 32 may also be formed. Note that the recessed part 33 including the rake surface 32r may also be formed to have a minimum required depth in consideration of cost and the like.

Substrate

Figure 2:
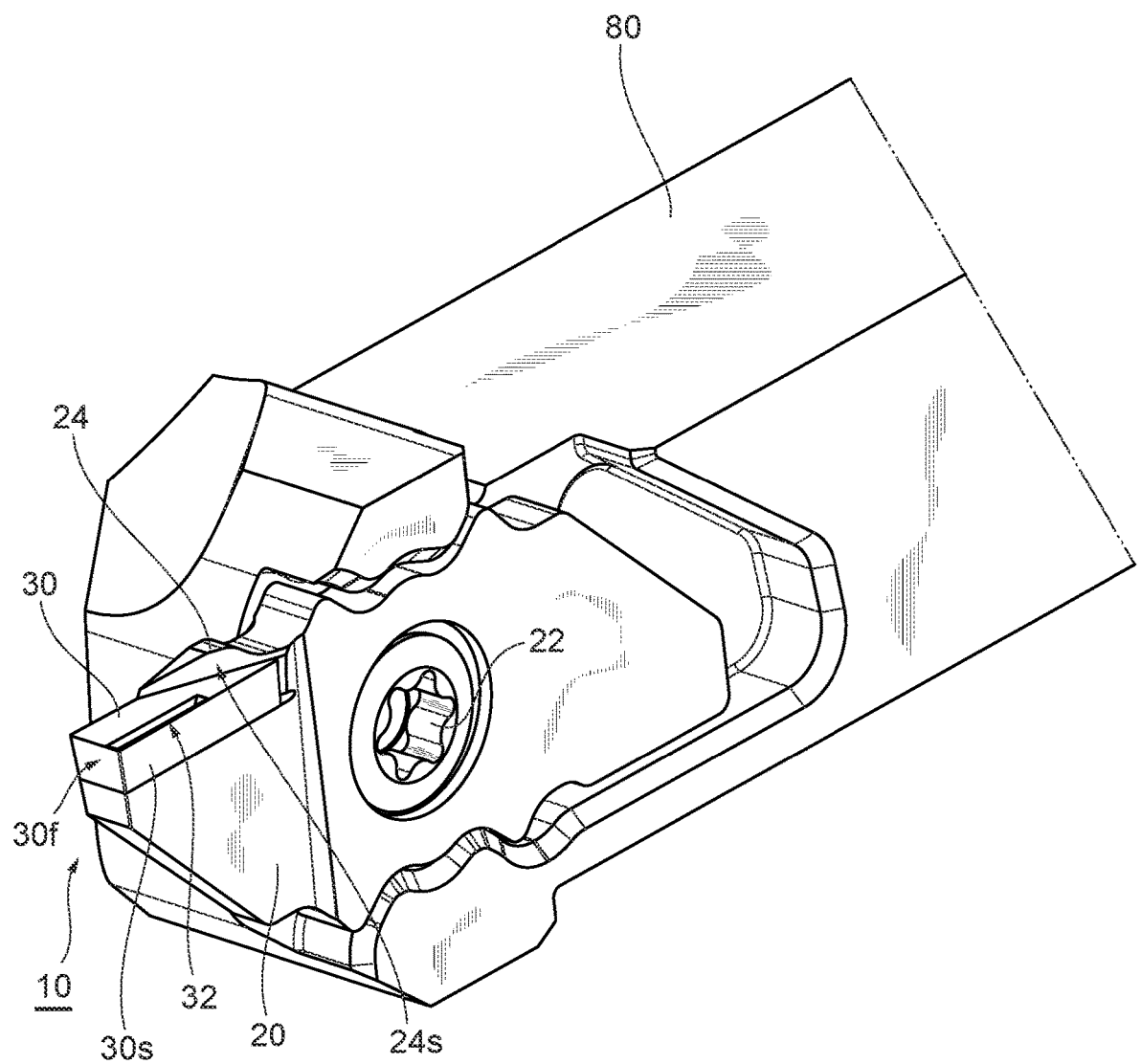
FIG. 2 is a diagram illustrating a frame portion in FIG. 1 in enlarged relation.

The substrate (base insert) 20 is a member for holding the cutting edge body 30 joined thereto by brazing and mounted on the cutting tool holder 80 by screwing (see FIGS. 1 and 2). The substrate 20 is provided with a screw hole 21 extending therethrough in, e.g., the lateral direction y of the cutting edge body 30 to screw the substrate 20 to the cutting tool holder 80 by using a screw 22 (see FIGS. 2 and 3 and the like). By the screwing, the cutting insert 10 is mounted in a longitudinally mounted state (a state where the front surface 30f of the cutting edge body 30 faces a leading end side of the cutting tool holder 80 in the longitudinal direction) on the cutting tool holder 80 (see FIG. 1 and the like).

Figure 10:
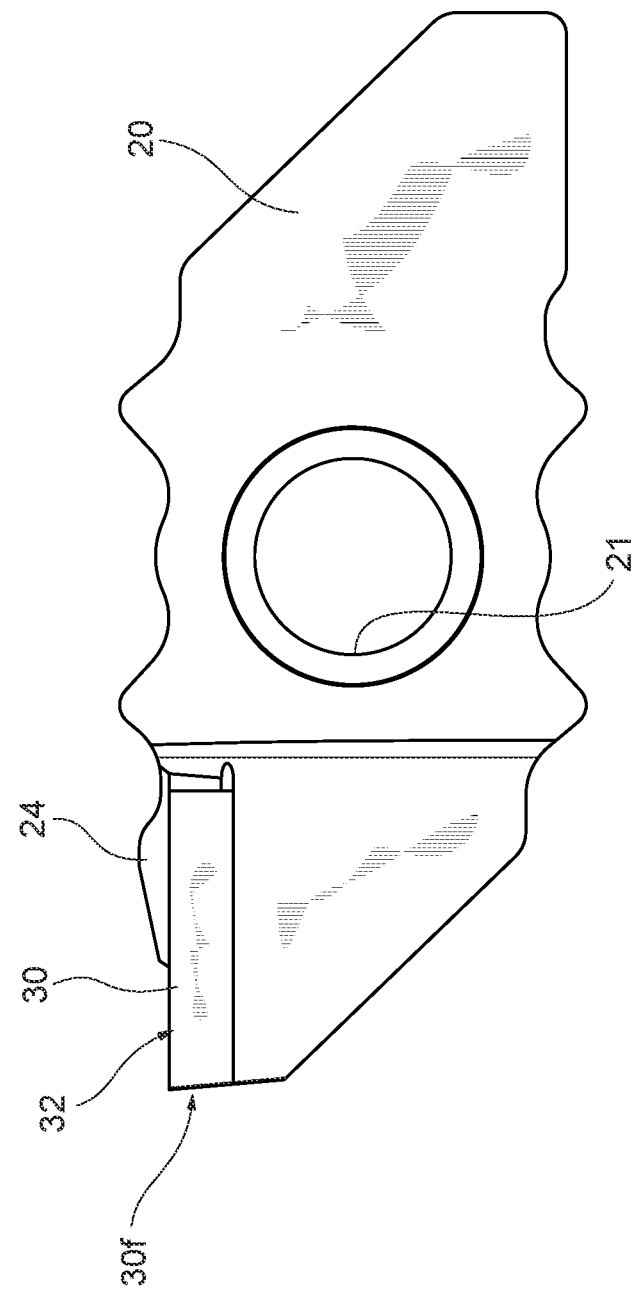
FIG. 10 is a right side view of the cutting insert.
Figure 11:
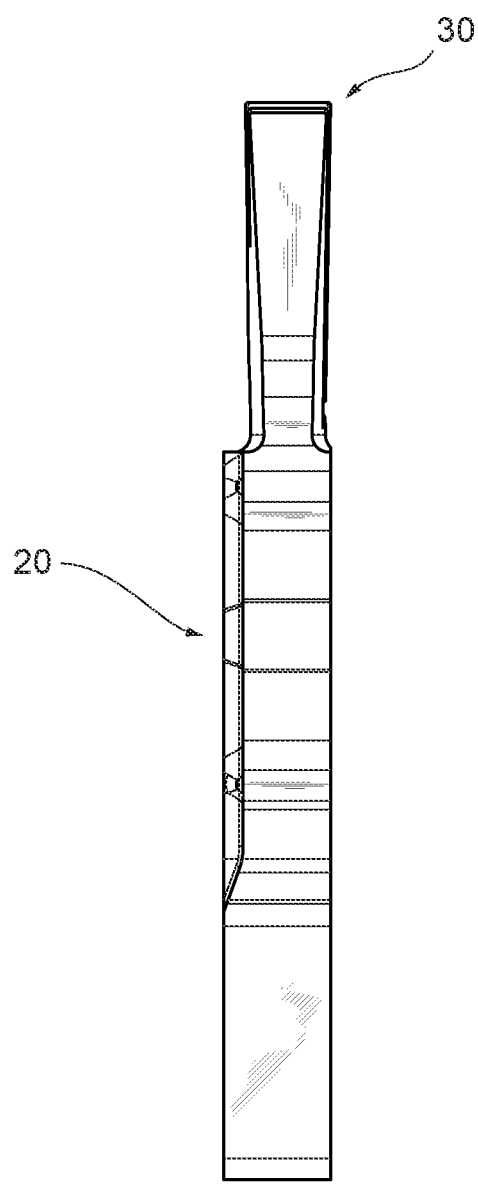
FIG. 11 is a bottom view of the cutting insert.

The substrate 20 is also formed with a projected part 24 upwardly projecting from a portion of the cutting edge body 30 (see FIGS. 5 and 10 and the like). For example, in the cutting insert 10 in the present embodiment, the projected part 24 is formed to protrude upward to reach a level higher than a highest position (i.e., the upper surface 30u) of the cutting edge body 30 in the vertical direction z. The projected part 24 is formed in a shape which may allow the projected part 24 to function as a chip breaker depending on circumstances so as to be able to appropriately control chips formed under a predetermined cutting condition on the other end side opposite to the one end side (side on which the side cutting edge 32 is formed in the case of the present embodiment) in the lateral direction y (see FIG. 3 and the like). For example, the projected part 24 in the present embodiment is formed as follows.

First, the projected part 24 is shaped to have an inclined surface 24s which is inclined with respect to the side cutting edge 32 in a top view (see FIGS. 6 and 13 and the like). The inclined surface 24s is formed to be inclined from the other end side in the lateral direction y to gradually approach the one end side (side on which the side cutting edge 32 is formed in the case of the present embodiment) with increasing distance from the front surface of the cutting edge body 30 (see FIGS. 6 and 13 and the like). When it is assumed that an angle of the inclined surface 24s with respect to the lateral direction y in a top view is β as an example of a reference (see FIG. 13), the angle β is preferably set to fall within a range of, e.g., 60° to 80° in terms of chip control described later.

Figure 15:
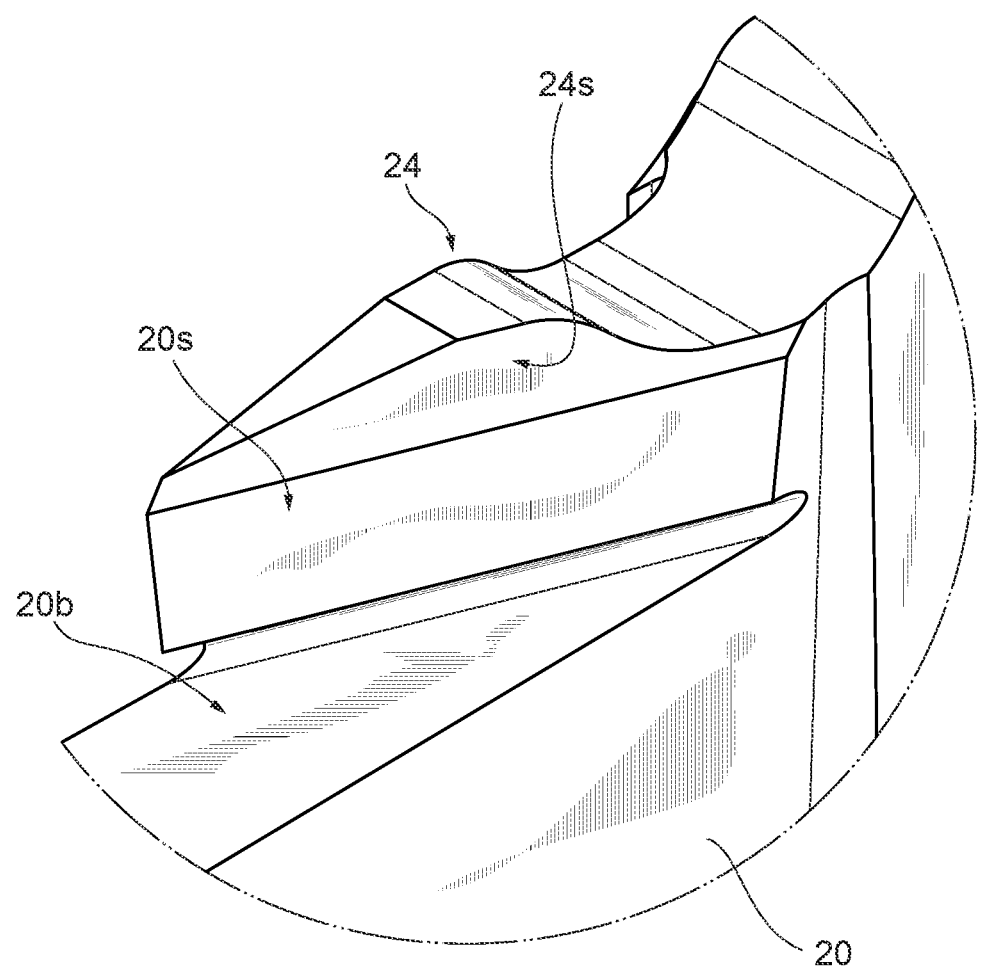
FIG. 15 is a diagram illustrating an encircled portion in FIG. 14 in enlarged relation.
Figure 16A:
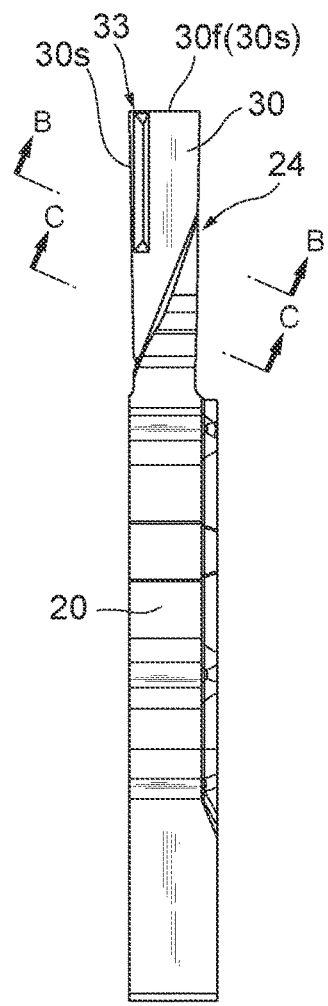
FIG. 16A is a plan view of the cutting insert.
Figure 16B:
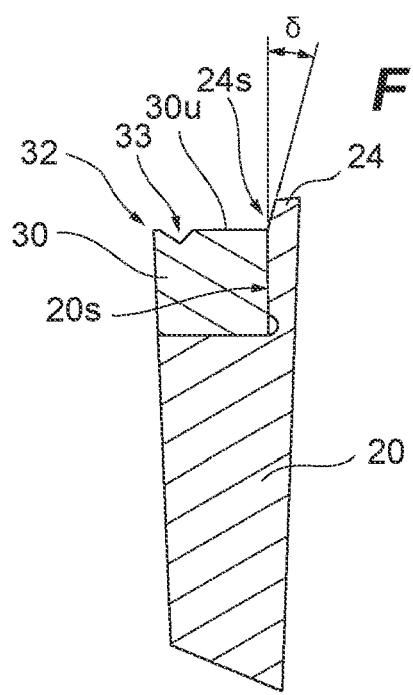
FIG. 16B is a cross-sectional view along a line B-B in the plan view illustrated in FIG. 16A.
Figure 16C:
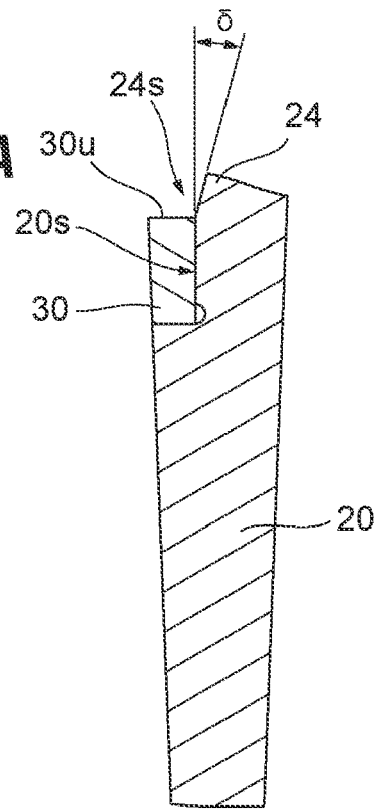
FIG. 16C is a cross-sectional view along a line C-C in the plan view illustrated in FIG. 16A.

In addition, the projected part 24 is formed to have an inclination angle γ of 5° to 10° with respect to a plane (x-y plane) perpendicular to the vertical direction z (see FIG. 5) and shaped to upwardly protrude with increasing distance from the front surface 30f of the cutting edge body 30 and reach a maximally projecting portion. The projected part 24 is also formed such that an inclination angle δ of the inclined surface 24s with respect to a plane (e.g., a plane obtained by extending a wall surface 20s) extending in the vertical direction has a value within a predetermined range (e.g., 5° to 70°, or preferably 5° to 10° (see FIGS. 15 and 16). The projected part 24 having the inclined surface 24s thus formed is preferred in terms of allowing chips discharged particularly during the high depth cutting to flow more smoothly, when bumping onto the projected part 24, to be controlled and thus allowing a resistance to be reduced.

Figure 14:
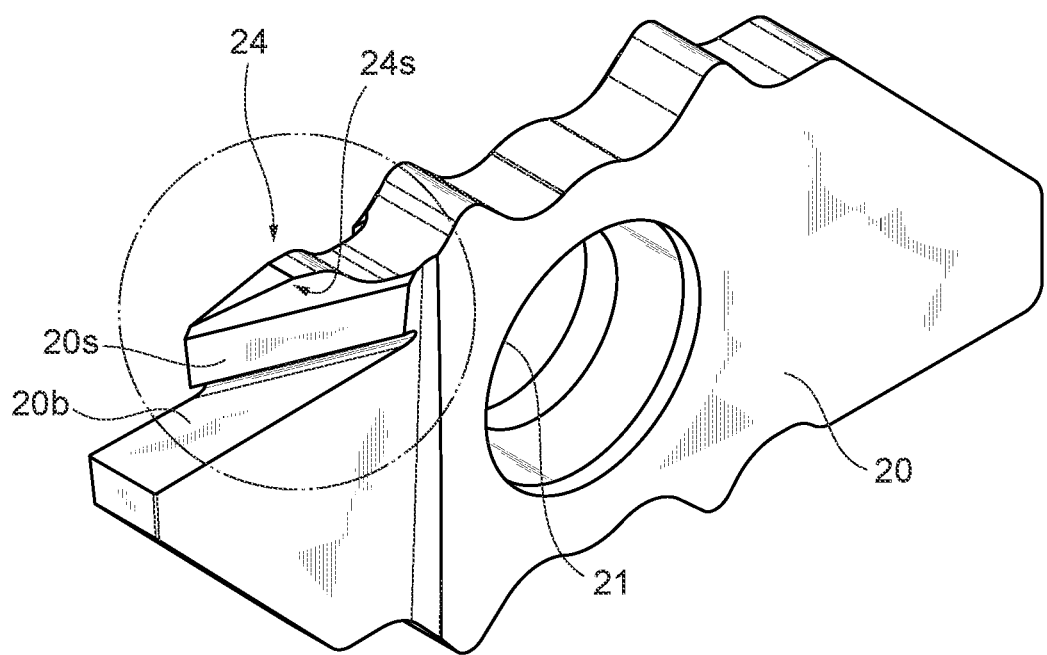
FIG. 14 is a perspective view illustrating an example of a substrate in a state where the cutting edge body is not joined thereto.

The projected part 24 may also be formed into a shape connected to any one of junction surfaces at which the cutting edge body 30 and the substrate 20 are joined together. For example, in the cutting insert 10 in the present embodiment, the substrate 20 is joined to the cutting edge body 30 at a first contact surface (bottom supporting surface) 20b in contact with a bottom surface of the cutting edge body 30 and at a second contact surface (wall surface) 20s in contact with a portion of the peripheral side surface 30s of the cutting edge body 30 (see FIGS. 14 and 15). When, of these contact surfaces 20b and 20s, the second contact surface (wall surface) 20s is shaped to be smoothly connected to the inclined surface 24s of the projected part 24 described above, there is no need to provide a step between the second contact surface (wall surface) and the inclined surface 24s of the projected part 24, and it is possible to continuously configure the two surfaces as flush surfaces and configure the two surfaces as surfaces continuously joined with no step formed therebetween. The configuration is preferred in terms of further simplifying a shape of the substrate 20 and allowing cost required for forming to be reduced.

The projected part 24 is also formed at a position distant by the predetermined value X2 from the front surface 30f of the cutting edge body 30 and provided such that the inclined surface 24s spans from the position toward a base end side of the cutting tool holder 80 (see FIG. 13 and the like). The predetermined value X2 is set so as to satisfy X2>X1 when compared to a length X1 of the side cutting edge 32 (see FIG. 13, and note that X1 may correspond not only to the length of the side cutting edge 32, but also to a length of the wall surface 36 of the recessed part 33 or to a length of the rake surface 32r thereof, but generally refers to a length of a portion which may be involved in cutting of the work 100 during the lateral feed machining). Such setting of X1 means that, in other words, the side cutting edge 32 (or the rake surface 32r or the wall surface 36 of the recessed part 33) overlaps the inclined surface 24s of the projected part 24 in a range in which a coordinate in the longitudinal direction x exceeds X2 and reaches X1 (see FIG. 13).

Cutting Tool Holder

Figure 17:
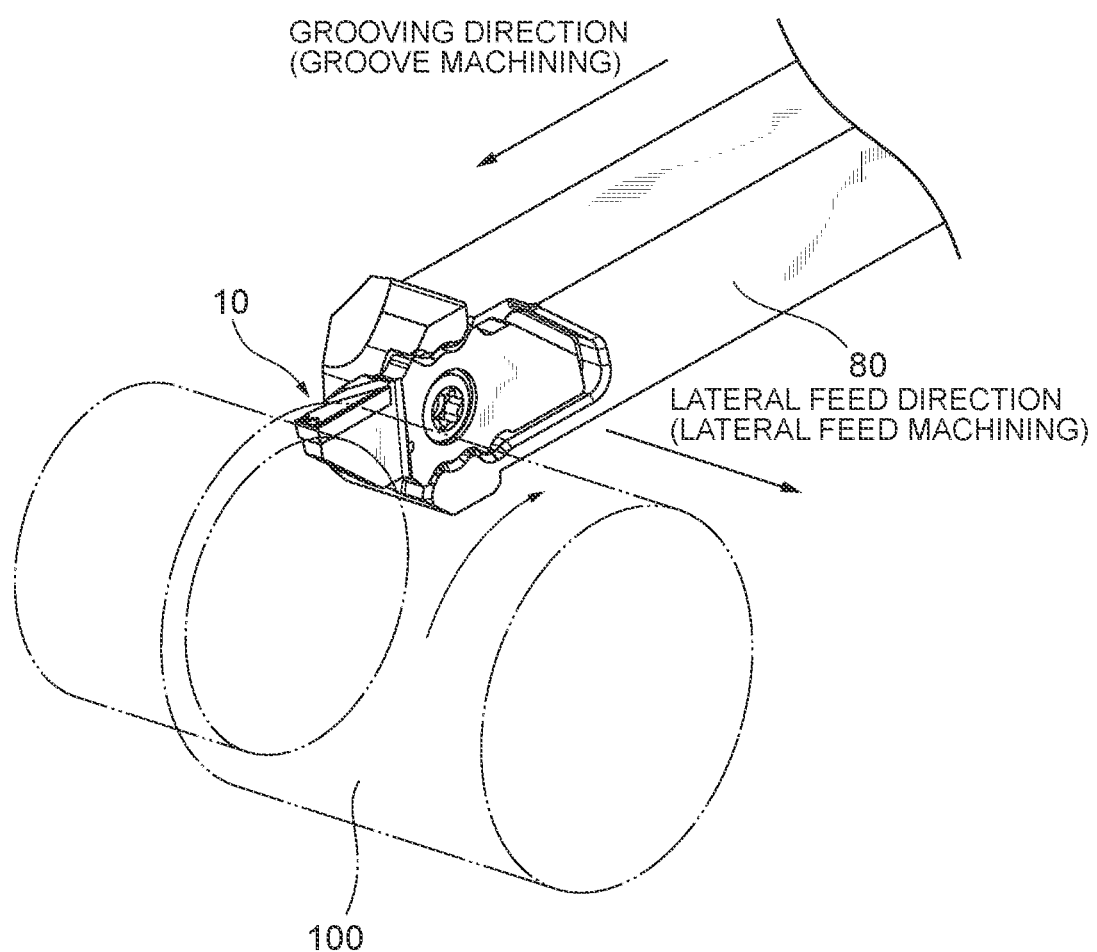
FIG. 17 is a perspective view of a work and the cutting insert, which briefly illustrates a grooving direction during groove machining and a lateral feed direction during lateral feed machining.
Figure 18:
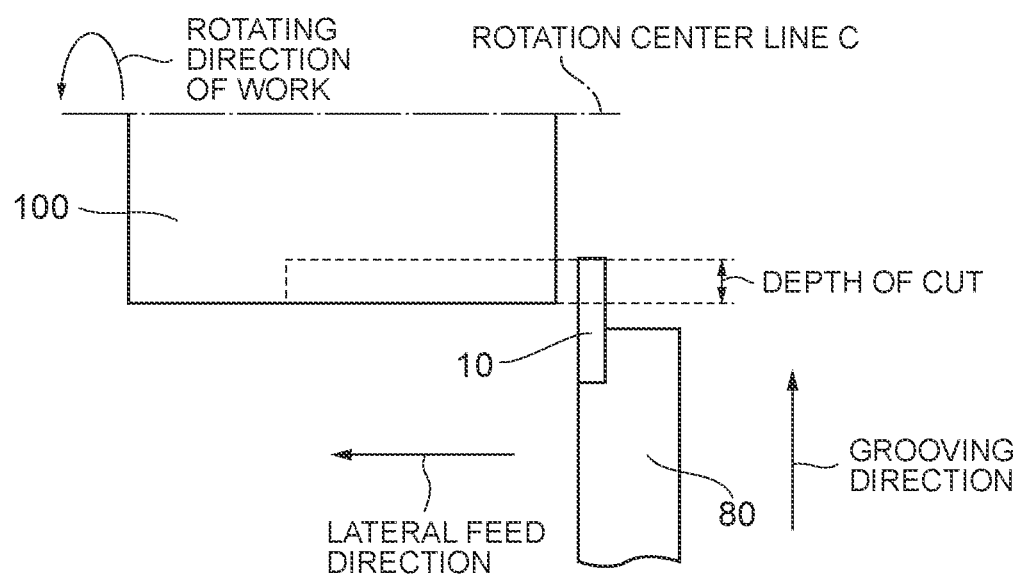
FIG. 18 is a plan view of the work and the cutting insert, which briefly illustrates the grooving direction during the groove machining and the lateral feed direction during the lateral feed machining.

The cutting tool holder 80 is a main body portion of the cutting tool holding the cutting insert 10 at a leading end portion thereof, and is provided to be capable of feeding in the grooving direction and the lateral feed direction by using the automatic lathe tool (illustration thereof is omitted) (see FIGS. 17 and 18 and the like).

Mode During Use

The cutting insert 10 configured as described above in the present embodiment is mounted on the cutting tool holder 80 and pressed against the work (workpiece) 100 rotating around a rotation center line C to cut the work 100 and transfer a predetermined shape thereto. Actually, the cutting insert 10 is first fed in the grooving direction along the longitudinal direction x of the cutting edge body 30 to perform groove machining, and further fed in the lateral feed direction along the lateral direction y perpendicular to the longitudinal direction x to perform lateral machining and external shape machining of the work 100 and thus form a groove measuring a length (width) of the front cutting edge 31 of the cutting edge body 30 or more (see FIGS. 17 and 18 and the like).

Characteristic Feature of Chip Control and Freedom of Feed

As described above, by the cutting insert 10 in the present embodiment in which X1 is set to satisfy X2 (Distance from Front Surface 30f of Cutting Edge Body 30 to Projected part 24)>X1 (Length of Side Cutting Edge) (see FIG. 13 and the like), a structure to be referred to also as a dual-stage chip breaker is provided in which, during the low depth cutting, chips (denoted by a reference sign 101 in FIGS. 8A, 8B, 12A, and 12B. Note that, in FIGS. 8A, 8B, 12A, and 12B, for the sake of easier understanding, the chips are illustrated in an exaggerated manner) are controlled by using the wall surface 36 of the recessed part 33 and, during the high depth cutting, the chips 101 are controlled by using the inclined surface 24s of the projected part 24 of the substrate 20. A description will be given by using a specific example. By way of example, by setting X2 to satisfy X2=2.9 mm, two types of control can be performed such that, under a cutting condition (i) under which an amount of cutting is less than a given value (less than 2.9 mm in this example), the wall surface 36 of the recessed part 33 of the cutting edge body 30 controls the chips 101 (see FIGS. 12A and 12B and the like) and, under a cutting condition (ii) under which the amount of cutting is equal to more than the given value (equal to or more than 2.9 mm in this example), the projected part 24 (the inclined surface 24s thereof) of the substrate 20 corresponding to a direction of flow of the chips controlled by the recessed part 33 controls the chips 101 (see FIGS. 8A and 8B).

The cutting insert 10 thus structured in the present embodiment is adaptable to a wide range of cutting conditions during low depth and high depth cutting and during low-feed and high-feed cutting. The cutting insert 10 thus configured is applied particularly to the lateral feed machining to be able to achieve a synergetic effect. In other words, when external shape machining is performed on the work 100 in a high-depth-of-cut state (see FIG. 18 and the like), the direction of flow of the chips 101 is controlled using the recessed part 33 to apply the chips 101 to the projected part 24 (the inclined surface 24s thereof) and thereby protect the groove wall surface located on a side on which the external shape machining is not performed and not facing the side cutting edge 32 from chip abrasion. With the cutting insert 10 from which such an operation is expected, a resulting improvement in a quality of a worked surface can be expected, which can be said to be particularly remarkable when the work 100 having excellent extensibility and a relatively high cutting resistance, such as an aluminum material, is an object to be cut. Therefore, the cutting insert 10 in the present embodiment is particularly useful in a case where an aluminum spool is formed by combining the groove machining and the lateral feed machining and performing unicursal external shape machining on the work 100 made of aluminum.

While the cutting insert 10 according to the embodiment of the present embodiment has been described heretofore, various changes can be made therein. For example, the cutting edge body 30 of the cutting insert 10 can be formed of an ultrahigh-pressure sintered body such as a diamond sintered body or a cubic boron nitride sintered body or of a material obtained by coating the hard material or the ultrahigh-pressure sintered body with a coating of any one selected from the group consisting of a carbide, a nitride, an oxide, a carbonitride, an oxycarbide, a carbon oxynitride, a boron nitride, and a boron carbon oxynitride of periodic table 4A, 5A, and 6A group metals, aluminum oxide, and titanium aluminum nitride or with an amorphous carbon thin film or the like by a CVD method, a PVD method, or the like.

Note that the embodiment described above is an example of preferred implementation of the present invention, but is not limited thereto. Various modifications can be made within a scope not departing from the gist of the present invention. For example, the cutting insert 10 described above in the embodiment is preferred as a multifunctional insert of a back turning grooving tool type. However, in a strict sense, the cutting insert 10 can improve the chip control and the quality of the machined surface irrespective of the use and shape of a chip, and the use of the cutting insert 10 is not particularly limited.

In a modification of the cutting insert 10 described above, within a range of a thickness of the ultrahigh-pressure sintered body forming the cutting edge body 30, the depth of the recessed part 33 can further be increased.

The present invention is preferably applied to an insert for cutting.

What is claimed is:

1. A cutting insert comprising:
a cutting edge body; and
a substrate to which the cutting edge body is joined,
the cutting edge body having a prismatic shape having a longitudinal direction and a lateral direction perpendicular to the longitudinal direction and including:
a cutting edge formed on an intersecting edge between a peripheral side surface and an upper surface of the cutting edge body having the prismatic shape; and
a recessed part formed at a position on the upper surface of the cutting edge body, the position being more distant from the intersecting edge than from the cutting edge,
the substrate having a projected part upwardly projecting from the upper surface of the cutting edge body,
a side cutting edge being formed on one side in the lateral direction, the side cutting edge being formed to extend from a front surface of the substrate in the longitudinal direction by a first predetermined value,
the projected part being formed to extend in the longitudinal direction, wherein the projected part is formed at a position away from the front surface of the substrate by a second predetermined value such that an exposed portion of the upper surface extends from the front surface of the substrate to a beginning of the projected part,
wherein the exposed portion of the upper surface is not inclined from the front surface of the substrate to the beginning of the projected part.

2. The cutting insert according to claim 1, wherein the cutting edge body is an ultrahigh-pressure sintered body to be joined to the substrate.

3. The cutting insert according to claim 1, wherein the cutting edge is connected to a rake surface having a positive rake angle in a cross section perpendicular to the cutting edge.

4. The cutting insert according to claim 3, wherein the recessed part has a recessed shape parallel to the side cutting edge in the lateral direction, the rake surface is inclined in a direction further away from the upper surface with increasing distance from the cutting edge, and the recessed part is further provided with a wall surface inclined at an angle having a sign opposite to that of the angle of the rake surface.

5. The cutting insert according to claim 4, wherein the wall surface is formed with a chip breaker.

6. The cutting insert according to claim 1, wherein the projected part has an inclined surface which is inclined with respect to the side cutting edge in a top view.

7. The cutting insert according to claim 6, wherein the inclined surface is formed so as to be closer to the one side in the lateral direction on which the side cutting edge is formed, with increasing distance from the front surface.

8. The cutting insert according to claim 7, wherein the inclined surface is formed at an angle of 60° to 80° with respect to the lateral direction in a top view.

9. The cutting insert according to claim 6, wherein the inclined surface has an angle of 5 to 10° with respect to a plane perpendicular to a vertical direction of the cutting edge body, and wherein the inclined surface is shaped to upwardly protrude with increasing distance from the front surface of the substrate.

10. The cutting insert according to claim 6, wherein the projected part is formed in a shape connected to any one surface at which the cutting edge body and the substrate are in contact with each other.

11. A cutting insert comprising:
a cutting edge body; and
a substrate to which the cutting edge body is joined,
the cutting edge body having a prismatic shape having a longitudinal direction and a lateral direction perpendicular to the longitudinal direction and including:
a cutting edge formed on an intersecting edge between a peripheral side surface and an upper surface of the cutting edge body having the prismatic shape; and
a recessed part formed at a position on the upper surface of the cutting edge body, the position being more distant from the intersecting edge than from the cutting edge,
the substrate having a projected part upwardly projecting from the upper surface of the cutting edge body,
a side cutting edge being formed on one side in the lateral direction, the side cutting edge being formed to extend from a front surface of the substrate in the longitudinal direction by a first predetermined value,
the projected part being formed to extend in the longitudinal direction, wherein the projected part is formed at a position away from the front surface of the substrate by a second predetermined value such that an exposed portion of the upper surface extends from the front surface of the substrate to a beginning of the projected part,
wherein the exposed portion of the upper surface is straight from the front surface of the substrate to the beginning of the projected part.

* * * * *